Nov. 3, 1931.   V. B. TREVELLYAN ET AL   1,829,971
FABRICATING MACHINE
Filed Nov. 5, 1928    11 Sheets-Sheet 9

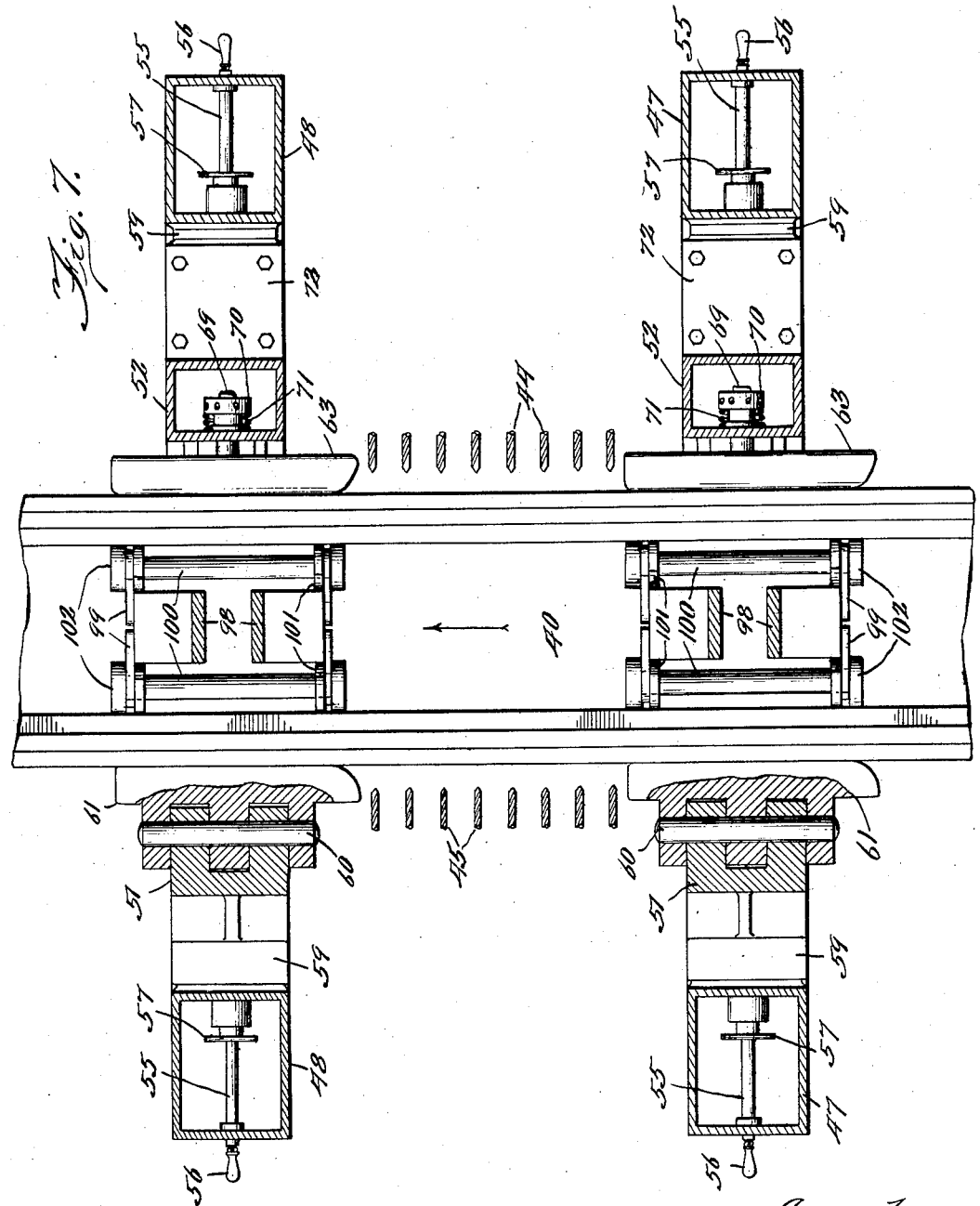

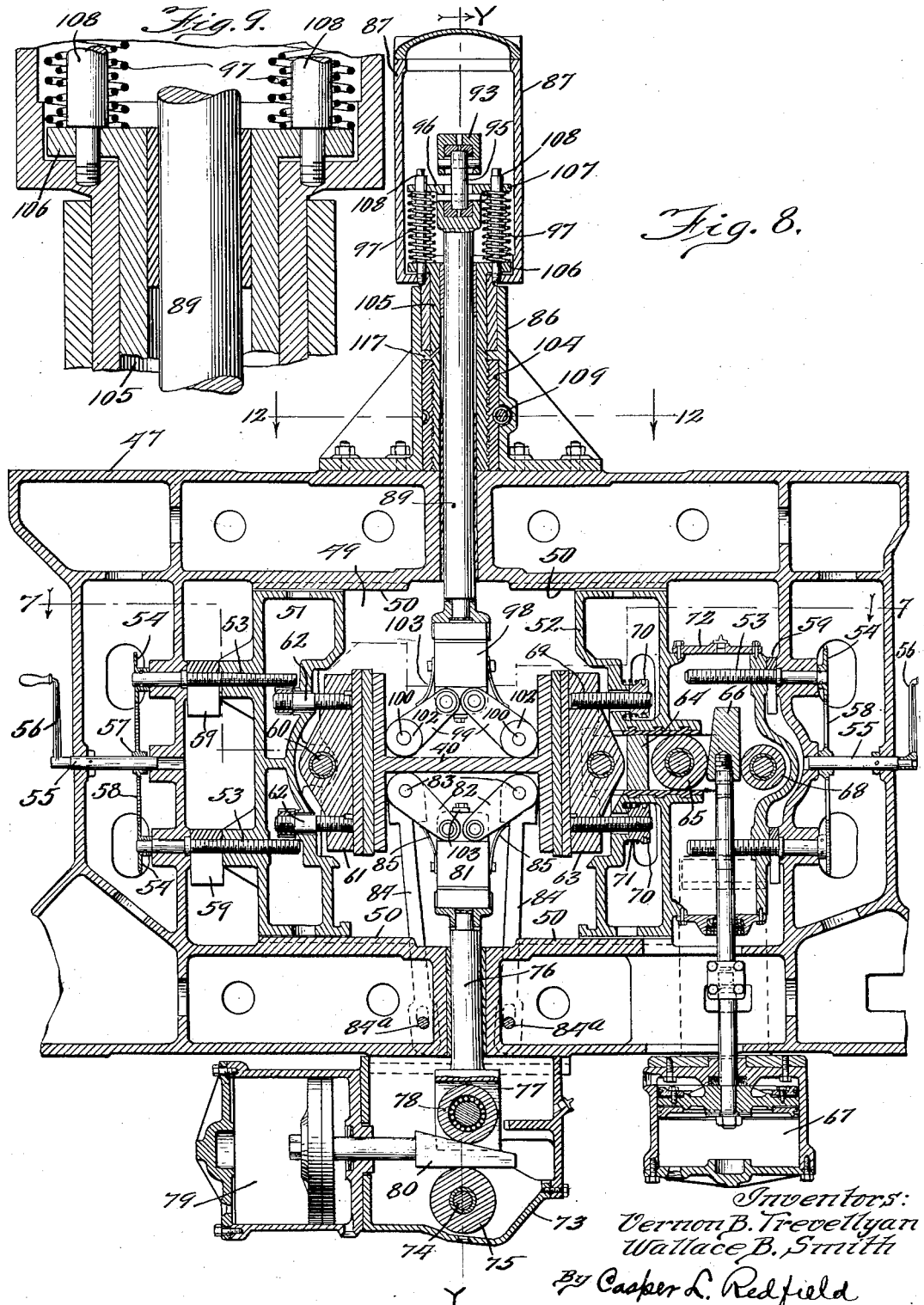

Inventors:
Vernon B. Trevellyan
Wallace W. Smith
By Casper L. Redfield
Atty.

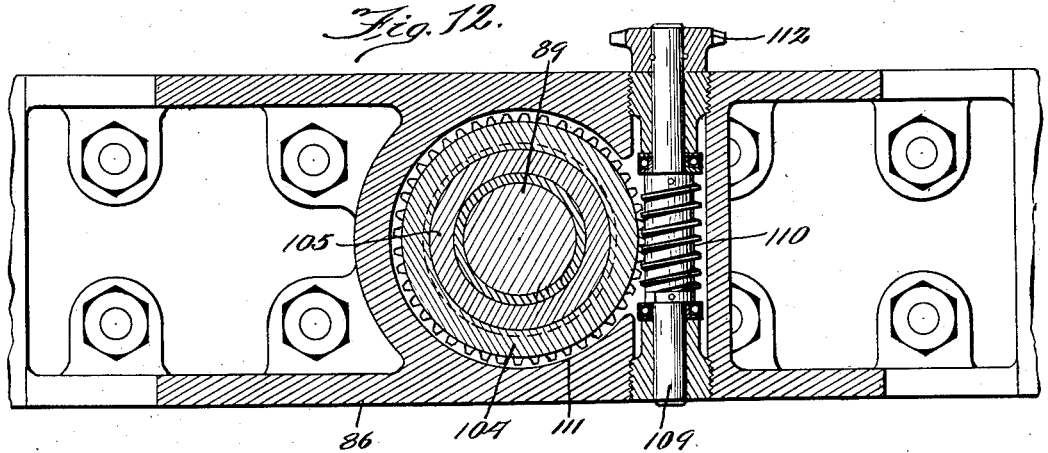
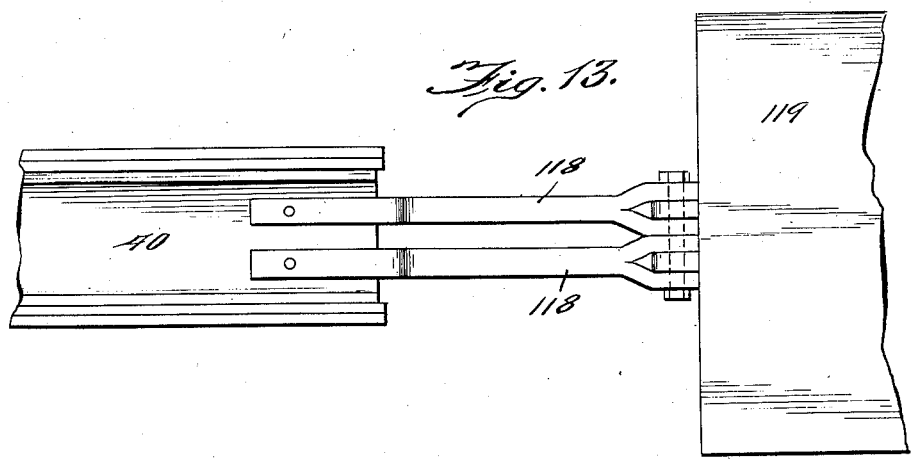
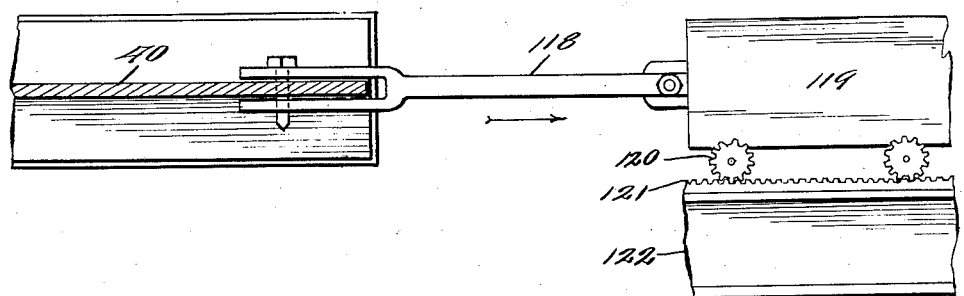

Nov. 3, 1931.    V. B. TREVELLYAN ET AL    1,829,971
FABRICATING MACHINE
Filed Nov. 5, 1928    11 Sheets-Sheet 11
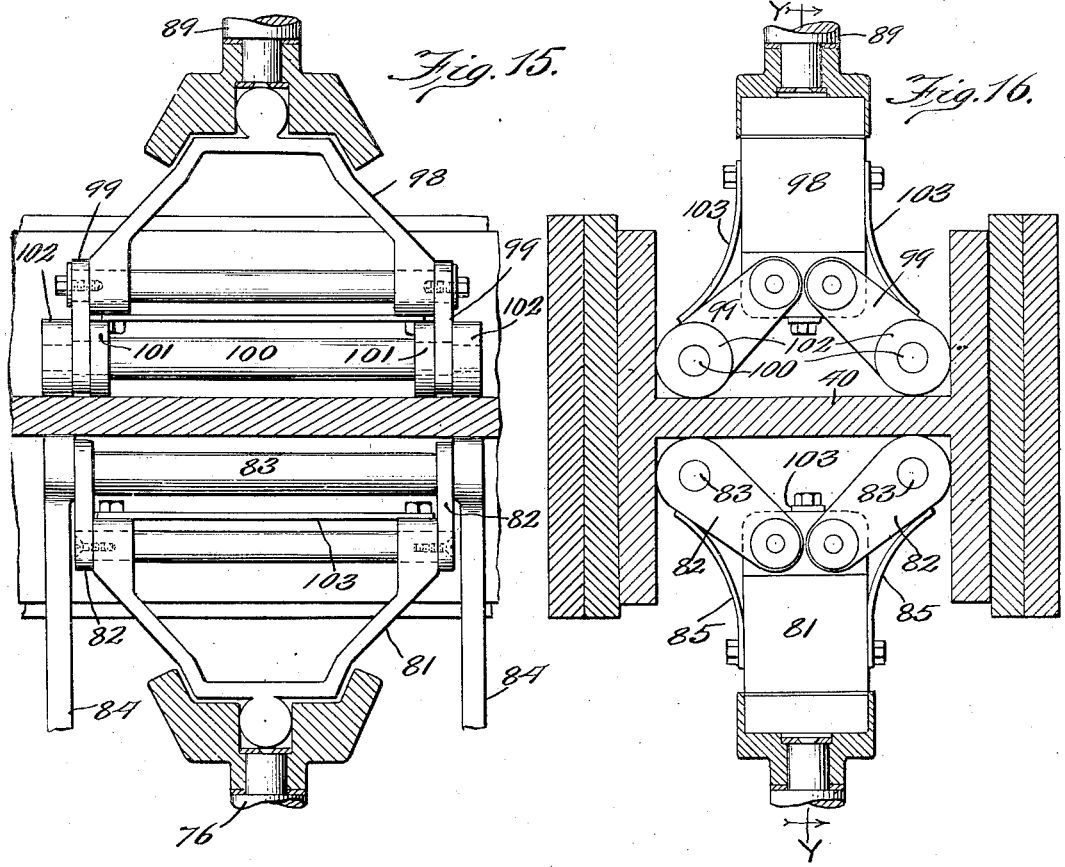
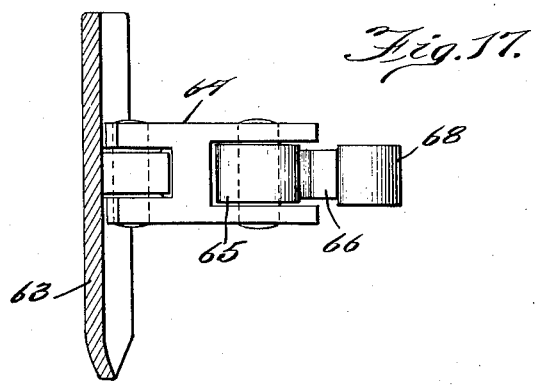
Inventor:
Vernon B. Trevellyan
Wallace W. Smith
By Casper L. Redfield
Atty.

Patented Nov. 3, 1931

1,829,971

UNITED STATES PATENT OFFICE

VERNON B. TREVELLYAN, OF EVANSTON, AND WALLACE W. SMITH, OF CHICAGO, ILLINOIS

FABRICATING MACHINE

Application filed November 5, 1928. Serial No. 317,246.

Our invention relates to machines for fabricating columns and girders which are composed of a plurality of metal shapes secured together by rivets and may be considered as an improvement on the machine described in our Patent No. 1,702,370, issued Feb. 19, 1929. Such columns or girders may be made up of plates and angles, or may be composed of H-columns or channel bars to which plates are secured. The machine is also adapted for forming groups of rivet holes in a rolled shape for the attachment of brackets or other bodies. The object of the invention is to provide improved ways for centering the work in the machine, for clamping and holding it, and for adjusting and controlling the drills used in forming rivet holes.

In the accompanying drawings:

Fig. 1 is a transverse section showing a group of structural shapes assembled in the form in which they are intended to assume is a finished column, but omitting the devices for assembling them. It also shows gangs or groups of drills for drilling the assembled elements in both vertical and horizontal directions. It also shows scales for setting the drills, and scales used in controlling their operations. In this view, the distance between the points of the drills and the work is shortened for condensation purposes;

Figure 1:
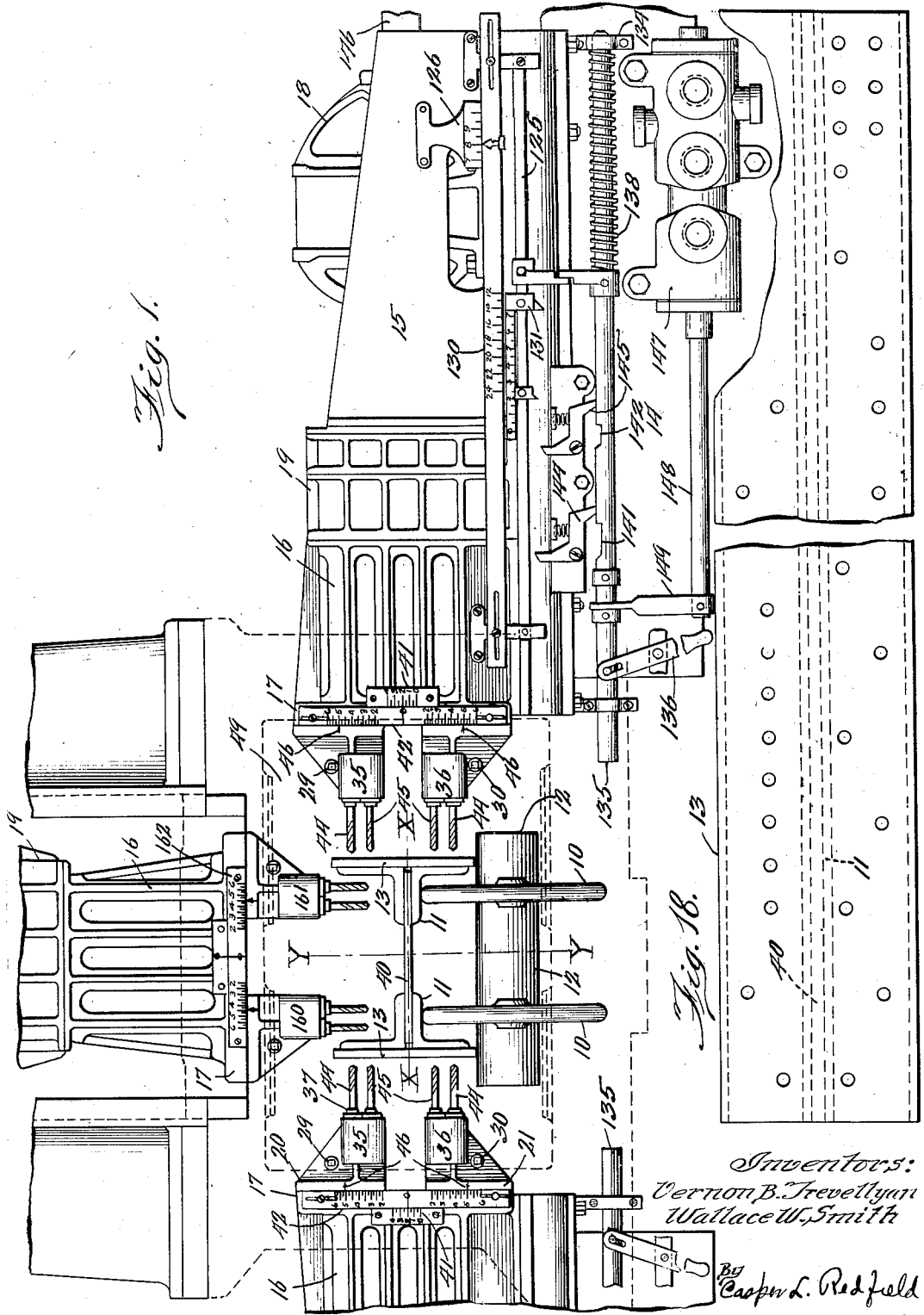
Figure 5:
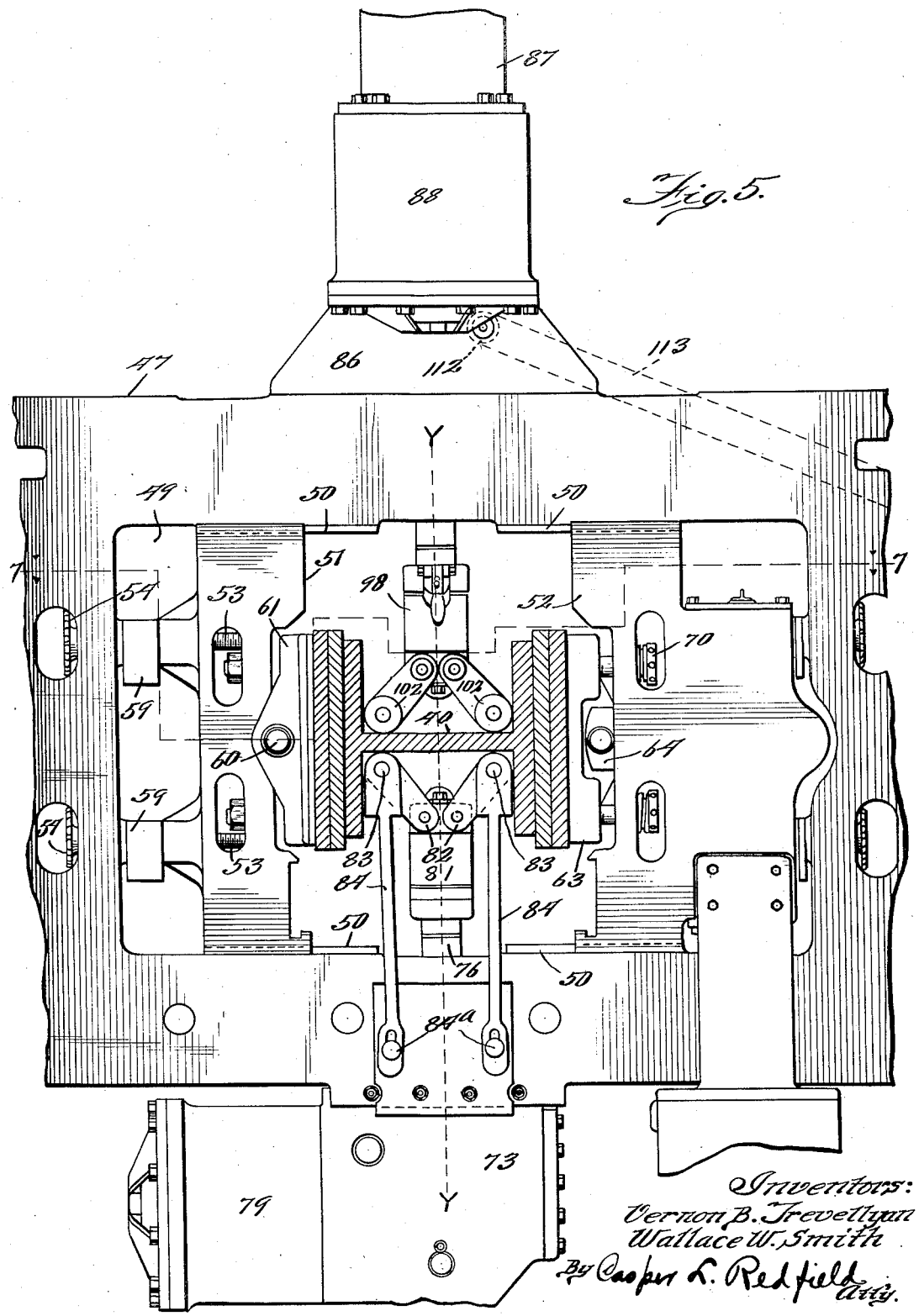
Figure 6:
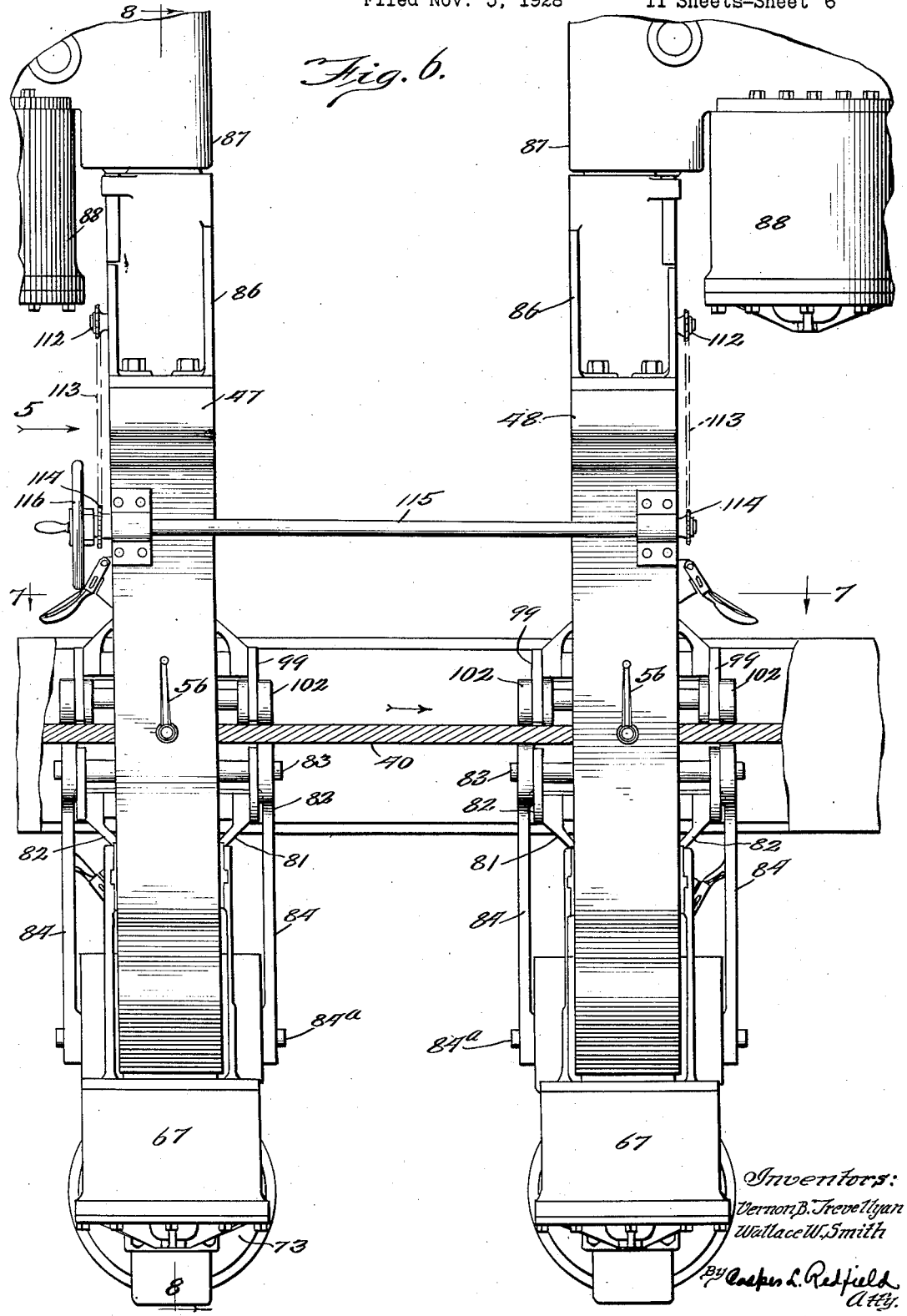
Figure 10:
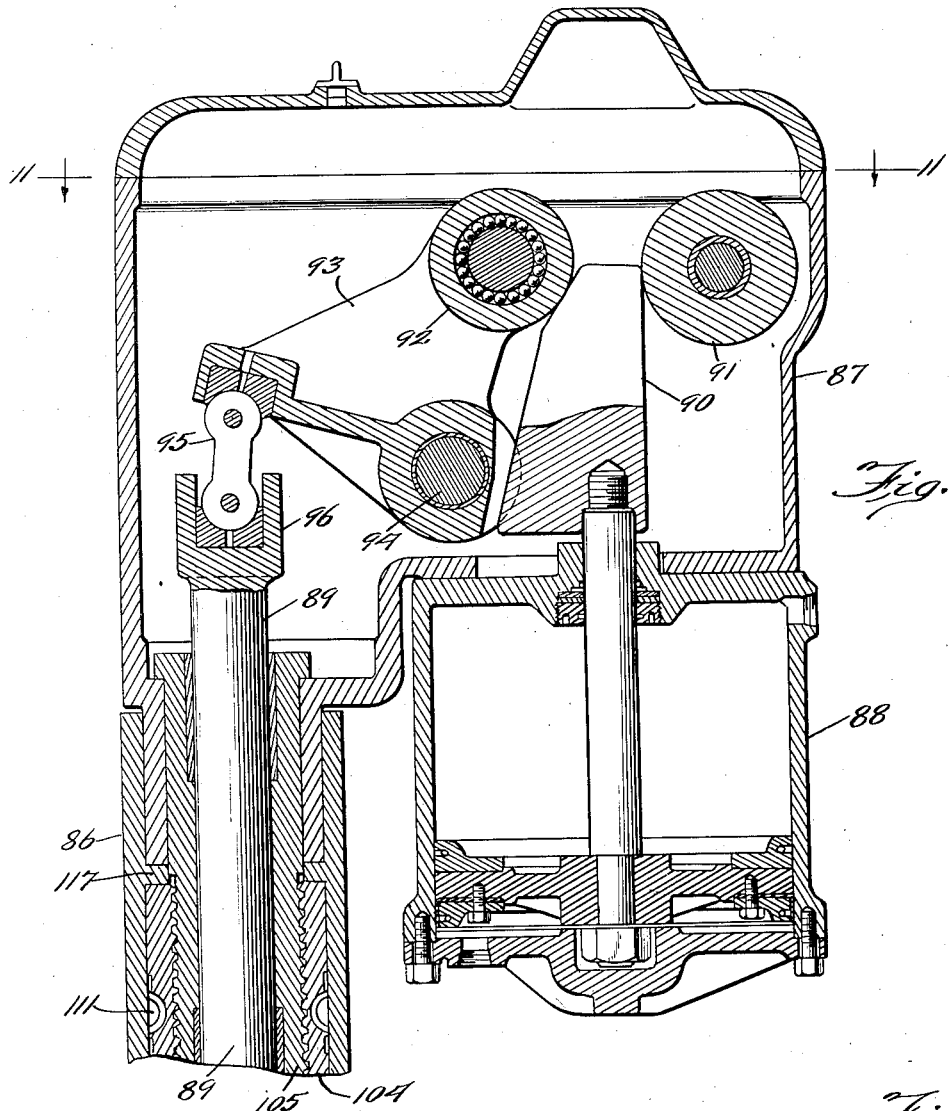
Figure 11:
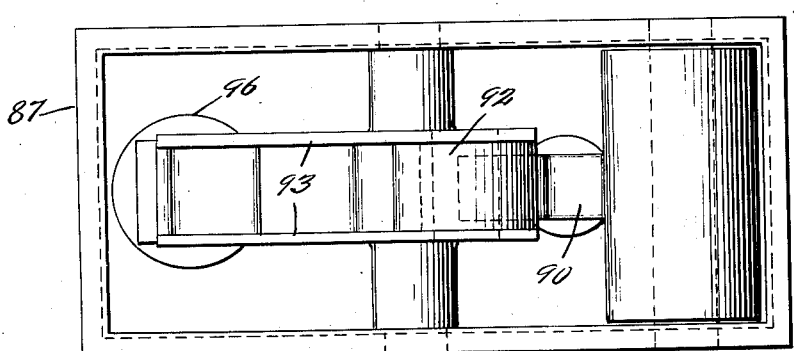

Fig. 5 is an enlarged elevation corresponding to Fig. 1, showing the frame and the clamping devices but omitting the drills and their associated parts. This view also shows the work as consisting of an H-column with cover plates in the place of the work consisting of plates and angles as shown in Fig. 1. It is a view in the direction 5 of Fig. 6;

Fig. 6 is an elevation perpendicular to Fig. 5, showing the two frames which support the clamping devices, and between which the devices of Fig. 1 operate;

Fig. 7 is an irregular section on lines 7—7 of Figs. 5 and 8;

Fig. 8 is a section on line 8—8 of Fig. 6;

Fig. 9 is an enlarged detail of Fig. 8;

Fig. 10 is an enlarged section of the clamp controlling devices shown in the upper parts of Figs. 6 and 8;

Fig. 11 is a plan of Fig. 10 with the cover removed, being a section on line 11—11;

Fig. 12 is an enlarged section on line 12—12 of Fig. 8;

Figs. 13 and 14 are plan and sectional elevation, respectively, of the end of a column and the connections by which the column is moved step by step through the machine;

Figs. 15 and 16 are enlarged elevations of the upper and lower clamping devices;

Fig. 17 is a detail of the clamping device at the right in Fig. 8; and

Fig. 18 is a side elevation of the column shown in Fig. 1 and illustrating distributions of rivet holes drilled by the horizontal drills.

Our present invention is of the same general type as that illustrated in our Patent No. 1,702,370 dated Feb. 19, 1929. In that machine, structural elements are loosely assembled in a channel formed of rollers, and then moved to a central drilling head where they are clamped into the final position which they are to occupy in the finished column. They are then drilled while so held.

The present invention retains the assembly channel without material modification, and has to do with the operations which occur at the drilling head. In Fig. 1, the rollers 10 represent the channel rollers which support the angle irons 11, and the roller 12 supports the cover plates 13. The rollers 10 are located at quite a distance from the drilling devices shown in Fig. 1, but are superposed on that view for illustrating the initial support for the work, which work consists of the assembled plates and angles surrounded by drills.

A general bed plate 14 has mounted thereon slides 15. On the slides 15 are heads 16, each terminating in a bracket or face 17. On each slide is a motor 18 which serves to drive a nest of gears in the part 19 of the associated head 16. As such construction is well known, it is not herein shown. As the arrangements above and on the two sides are alike, we will continue this part by describing the apparatus at the left in Fig. 1, which is the apparatus shown at a larger scale in Figs. 2 and 3.

Figure 3:
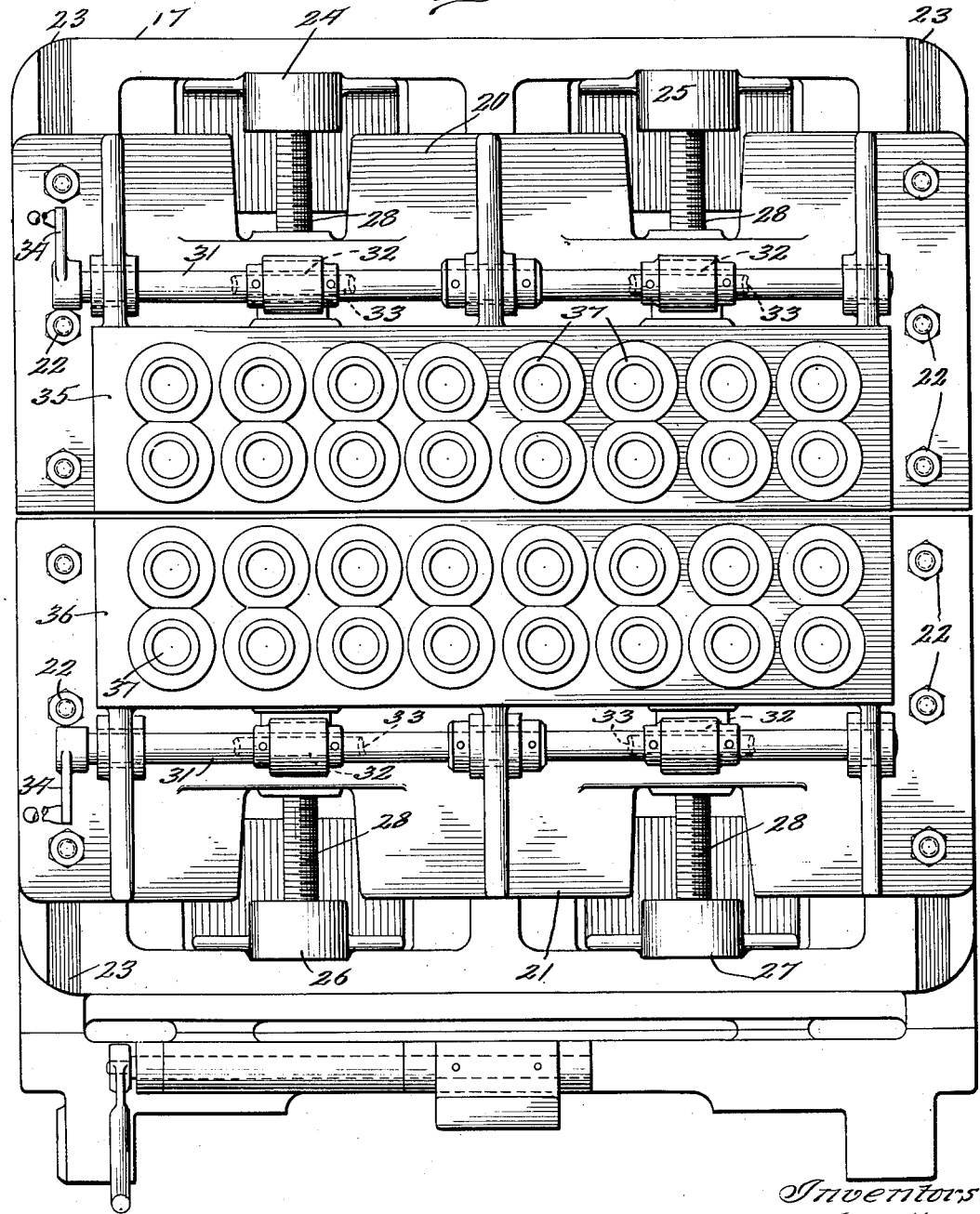
Fig. 3 is a face elevation of Fig. 2.

On the bracket or face 17 are slides 20 and 21 which are clamped to the bracket by bolts 22 having heads in T-slots 23 (Fig. 3). On the upper part of bracket 17 are bosses 24 and 25, and on the lower part of the same bracket are bosses 26 and 27. Secured in these bosses are stationary screws 28. Located at 29 on slide 20 and at 30 on slide 21 are transverse shafts 31 on which are worms 32 which engage worm gears 33 on the screws 28. The gears 33 are nuts mounted to turn on the screws 28, and are held to the slides 20 and 21 in the ordinary manner. Handles 34 on shafts 31 serve to turn the worms 32.

Solid on the slide 20 is a block 35, and solid with slide 21 is a block 36. In these blocks are drill sockets 37 which are spaced horizontally and vertically the normal distance given to the spacing of rivet holes in the columns to be drilled.

Figure 2:
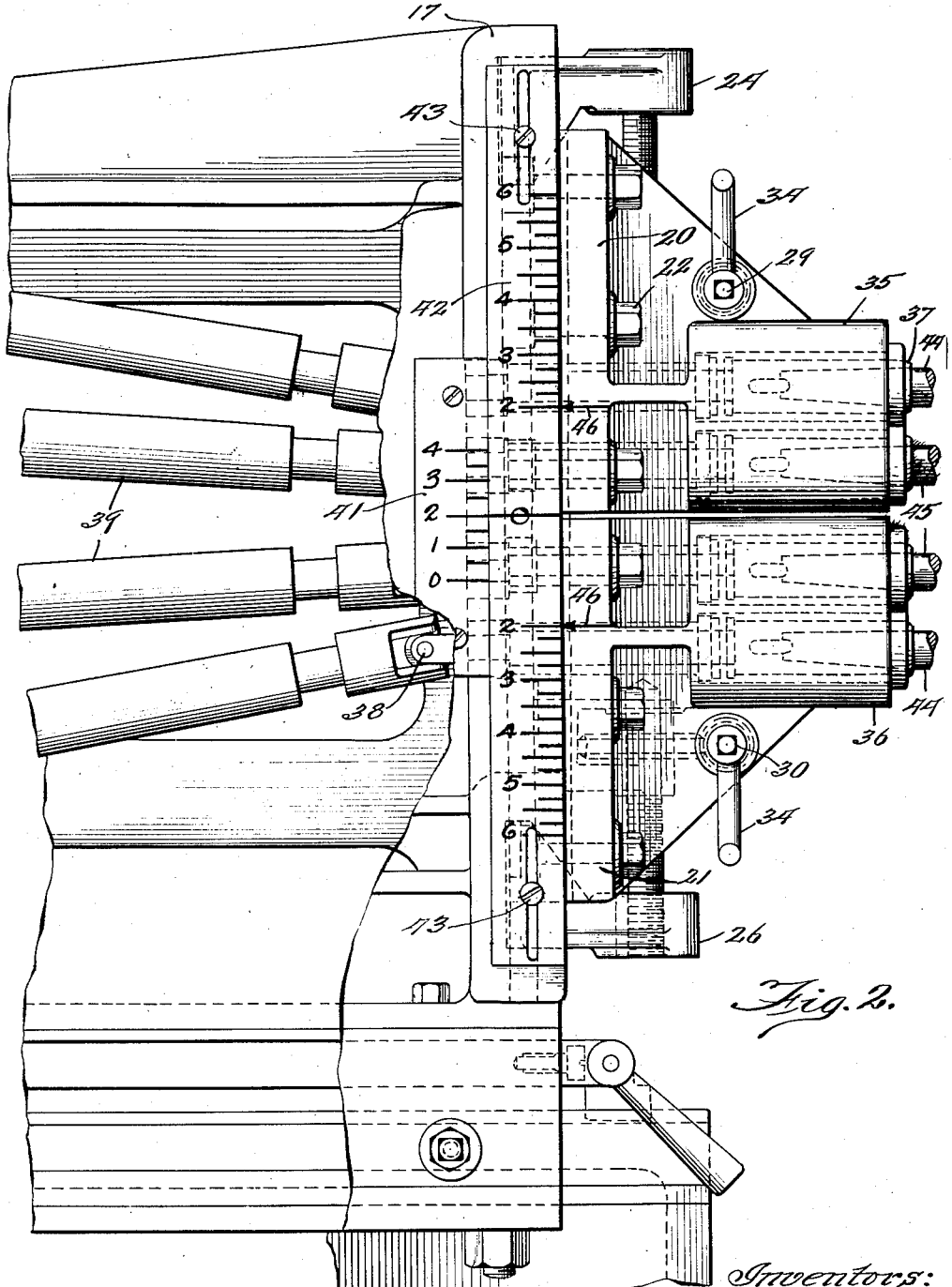
Fig. 2 is an enlarged elevation of the left hand drilling head shown in Fig. 1.

In Figs. 1 and 2 we have shown two rows of drills or drill sockets, and in Fig. 3 we have shown eight drill sockets in each horizontal row. As shown in Fig. 2, each drill socket 37 is connected by shaft to a universal joint 38, and each joint in turn is connected through a slipping connection 39 to a gear in the nest of gears before mentioned. As this arrangement of driving gangs of drills is old, the present description stops at connections 38 and 39.

In Figs. 2 and 3, the blocks 35 and 36 are shown close together, and in Fig. 1 they are shown separated by a considerable distance. In machines for drilling assembled structural shapes, there is some certain point or plane from which all measurements are taken. In the present case, this point is the upper edge of the rollers 10 upon which the angle irons 11 rest. On these angles is a plate 40, and on this plate are other angles. The plate 40 is the central web of the group of elements to be drilled, and the line X—X represents an imaginary horizontal plane running through the center of the work. The horizontal drills 44 are to be adjusted vertically so that the holes drilled will be at predetermined distances from this plane. As the top of the rollers 10 is fixed, and as there are variations in the thicknesses of the angles 11 and plates 40 for columns of varying dimensions and weights, the location of the plane X—X is a variable quantity.

Secured on the horizontal heads 16 are small scales 41, the "0" marks of which are on a level with the lines of contact between the rollers 10 and the angle irons 11. These scales are half size scales, and have the indicating marks running upward from the "0". Adjacent to the scales 41 are scales 42 which are vertically adjustable by means of screws 43 in the sides of the brackets 17 and extending through slots in the scales 42. The central points on scales 42 have zero marks, and above and below these scales have inch marks graduated at full size.

In Figs. 1 and 2, the zero mark of scales 42 are set at the numeral "2" on scales 41. This means that the center points of scales 42 are one inch above the lines of contact between rollers 10 and angle irons 11.

In the drill sockets 37 are drills 44 and 45 for drilling holes through the plates 13 and adjacent angle irons. These sockets are in the blocks 35 and 36 on the slides 20 and 21, which slides are moved upwardly or downwardly by turning the handles 34 on the shafts 31.

On the edges of the slides 20 and 21 are arrow marks 46 which come adjacent to the graduations on the scales 42. When the slides 20 and 21 are adjusted so that the blocks 35 and 36 are equal distances above and below the zero mark on scale 42, the arrows 46 indicate the distance in inches between the drills 45 in said blocks.

In Fig. 1, the zero marks on scales 42 coincide in level with the line X—X through the center of the work, and slides 20 and 21 are adjusted so that the arrows 46 point to the numerals "5" on scales 42. This means that the drills 45 are five inches from each other, and are equal distances above and below the plane X—X. In Fig. 2, the blocks have been moved toward each other until the drills 45 are two inches from each other, and are equal distances above and below the plane X—X.

The upper part of the general bed plate 14 consists of two upright standards 47 and 48 (Figs. 6 and 7) which are spaced apart a sufficient distance to permit the slides 15 to move the drills upon the work by passing between said standards. Each standard has in it a rectangular opening 49 for the passage of the work through the machine, and also for receiving the clamping devices which hold the work at the times when it is being drilled.

Projecting into the openings 49, above and below, are guides 50, and supported in these guides are slides 51 and 52, (Figs. 5, 7 and 8). Supported to turn in the left hand part of standards 47 are screws 53 having sprocket wheels 54 on their outer ends. Supported between the screws 53 is a shaft 55 provided with a handle 56 and a small sprocket wheel 57. A chain 58 engages all three wheels.

It will be evident that by turning the handle 56, the screws 53 may be turned in either direction. The inner ends of screws 53 are tapped into bosses on the slide 51. As a consequence of this construction, the slide 51 may be moved toward or from the center of the machine by using the handle 56 for that purpose.

Supported on the screws 53 between the standards and the slides 51 are spacing pieces 59, which are in the form of horse shoes. By turning screws 53 so as to move a slide 51 toward the center of the machine, the spacing pieces 59 may be removed and other ones of different thickness may be substituted. By then turning the screws 53 so as to bring the slide 51 against the substituted spacing pieces, the said slide has a firm backing against the frame work of the machine.

At the center of vertical length of each slide 51 is a pivoting pin 60, and mounted upon this pin is a shoe 61. The manner of pivoting will be clear by comparing Figs. 5, 7 and 8 with each other.

Secured in the shoe 61 are two studs 62 (Fig. 8) which extend through adjacent openings in the slide 51 and have nuts on their other ends. By tightening these nuts the shoe 61 may be held in a fixed position so that any body of work coming in contact with the face of the shoe will be held at a predetermined position. Or, by slacking the nuts on studs 62, the shoe 61 may be left free to accommodate itself to slight irregularities of the work. The fixed setting of the shoes is used when the work is like that shown in Fig. 1, and the self-accommodating setting is used when the work is like that shown in Figs. 5 and 8.

The slides 52 are wider in the direction transverse of the machine, and the shoes 63 are pivoted on supplementary slides 64 carred in the slides 52. Also, on each supplementary slide 64 is pivoted a roller 65 which is engaged by a wedge 66 operated from a motor 67. Back of the wedge 66 is another roller 68 pivoted in the slide 52, (Figs. 7, 8 and 17).

Secured in the shoes 63 are studs 69 which correspond to the studs 62. The studs 69 are secured in fixed positions in the shoes 63, and nuts 70 on the other ends of the studs are adjusted so as to bring the faces of the shoes 63 vertical. The nuts 70 are then pinned or otherwise secured to studs 69. Between the nuts 70 and the adjacent part of the slide 52 are compression springs 71.

When the motors 67 thrust the wedges 66 upward between rollers 65 and 68, the supplementary slides 64 are moved toward the center line of the machine so as to bring the shoes 63 against the work to be clamped. When the motors 67 are released to draw the wedges 66 downward, the springs 71 act as retracting devices to move the supplementary slides 64 and shoes 63 back from clamping position.

There are screws 53, sprockets 54, chain 58, handle and spacers for the slide 52 as before described for slide 51. Covers 72 serve as means for putting oil or grease in the chambers which contain the wedges 66 and the rollers between which they work.

Secured to the under parts of the standards 47 and 48 are casings 73. Describing one of these, the casing 73 (Fig. 8) has a fixed pin 74 on which is mounted a roller 75. At the lower central part of standard 47 is a vertical sliding shaft or plunger 76. On the lower end of plunger 76 is a rectangular housing 77 in which is pivoted a roller 78 located above the roller 75. At one side of the casing 73 is a fluid pressure motor 79 arranged to drive a wedge 80 between rollers 75 and 78.

On the upper end of plunger 76 is a head 81 to which are pivoted four links 82 arranged in pairs on opposite sides of the central vertical plane which runs longitudinally through the machine, and is represented by line Y—Y in Figs. 1 and 16. Horizontal pins 83 connect the upper ends of each pair of links 82 together.

On the ends of pins 83 are long links 84, the lower ends of which are slotted and embrace pins 84a on the lower part of frame or standards 47. The links 82 and 84 come adjacent to each other on pins 83. Secured to the head 81 are leaf springs 85 which bear against links 82 or pins 83 and serve to move the upper ends of links 82 and 84 toward the vertical central plane of the machine.

On the upper central parts of standards 47 and 48 are brackets 86, and on these brackets are heads 87 which carry fluid pressure motors 88. In the center of each bracket 86 is a plunger 89 which is operated by its motor 88.

The motor 88 forces a wedge 90 (Fig. 10) upward between a stationary roller 91 and a roller 92 on a bell crank 93 pivoted at 94. The second arm of the bell crank operates through a link 95 jointed to said arm and a head 96 on the upper end of plunger 89. Springs 97 (Figs. 8 and 9) serve to raise the plunger 89 when the motor 88 falls back.

By observing Fig. 10 it will be seen the wedge 90 has two angles, a blunt one at the upper end, and a sharper one below. This construction is so that the beginning of a downward movement of the plunger will be rapid and the later or final portion will be slower and with greater force.

On the lower end of each plunger 89 is a head 98 which corresponds to the heads 81 on plungers 76. On each head 98 are links 99 which are connected together at their outer ends by pins 100, as shown most clearly in Figs. 15 and 16, and on these pins are rollers 101 and 102. Also on head 98 are springs 103 for pressing the links 99 toward each other. These springs are shown in Figs. 8 and 16, but are omitted from other views for clearness.

The plungers 76 and 89, and parts carried thereby, form complementary parts of clamping devices which engage the lower and upper faces of the work to be drilled.

The clamping devices themselves are carried directly upon the heads 81 and 98, which heads are removable from the plungers so that other heads having different clamping devices may be substituted therefor. The different clamping devices are for columns or other work of different proportions.

The clamping devices above and below may be the same, or they may differ somewhat because of shape of the work to be clamped. The lower clamping devices, however, are provided with the links 84, for which there are no corresponding parts on the upper clamps.

As before mentioned, the links 84 have slotted ends operating on pins 84a in some fixed part of the frame work. These parts are so arranged that when the motor 79 drives the lower clamping devices upward, that upward movement is arrested by the lower ends of the slots engaging pins 84a.

When the lower clamping devices are at their lower positions, the springs 85 push the free ends of links 82 toward each other. This movement is arrested by bars 103 bolted to the top of the heads 81 at the line of the vertical plane Y—Y. When so arrested, the links 82 stand at an inclination somewhat less than that of the clamping position shown in the drawings. When the plunger 76 is thrust upward, the free ends of links 82 striking the web 40 of Figs. 5, 8 and 16, or the angle irons 11 of Fig. 1, and are forced outward into the corners as shown in Figs. 5, 8 and 16.

The links 82 are so related to the work to be clamped, and so related to the slots in the links 84, that the stoppage of the upward movement of the lower clamping devices leaves their upper edges on, or slightly above, the level of the highest points on the rollers 10 of Fig. 1. In other words, the pins 84a serve to determine the elevation of the face from which the plane X—X is ultimately determined.

In each bracket 86 is a sleeve 104 (Figs. 8 and 10) which has an internal screw thread engaging a corresponding screw thread on an inner sleeve 105. The sleeve 104 is in fact a nut operating on the sleeve 105 as a screw. The sleeve 105 has on it ears 106, and the head 96 of plunger 89 has ears 107. The retracting springs 97 before mentioned are located between ears 106 and 107 and are held in place by pins 108 secured in head 87. These pins also prevent the plunger 89 and sleeve 105 from turning.

In each bracket 86 is a horizontal shaft 109 (Figs. 8 and 12) on which is a worm gear 110 operating in gear teeth 111 cut in the side of the sleeve 104. On the end of shaft 109 is a sprocket wheel 112, from which a chain 113 extends to a sprocket wheel 114 on shaft 115, (Figs. 5 and 6). On shaft 115 is a hand wheel 116.

Each nut 104 is located between the frame of the machine and on inside shoulder 117 on its containing bracket 86. As a consequence, these nuts are held against longitudinal movement. It will be evident that by turning the hand wheel 116, power will be conveyed to move the sleeves 105 upward.

The heads 87 have their lower portions telescoping into the upper ends of brackets 86. The pins 108 are screwed into the heads 87 and have shoulders over the ears 106 of nuts 105. As a consequence, turning the hand wheel 116 operates to raise or lower the heads 87 and the motors 88 carried thereby.

As before mentioned, the elements of the column are assembled in a channel having a bottom represented by the upper edges of the rollers 10. These elements may consist of the structural shapes shown in Fig. 1, or the parts shown in Figs. 5, 6 and 8. After assembly, they are moved by any convenient means to that part of the frame work represented by the standards 47 and 48.

When the work has been advanced to this point, its web 40 is connected to links 118 which in turn are connected to a spacing table 119, (Figs. 13 and 14). The spacing table is movable in the direction of the arrow by gears 120 operating in a rack 121 on a fixed table 122. The spacing table is a well known device for moving work step by step for punching machines, and need not be described here. As far as this invention is concerned, the spacing table is simply a device for advancing the work step by step through the machine.

After the work has been connected to the work-feeding device 119, the motors 79 operate to raise the lower clamps until they are stopped by the links 84 coming into contact with the pins 84a. In this movement, the lower clamps engage the lower contact face of the work to bring that contact face to a fixed elevation. This may be the exact elevation of the upper edges of rollers 10, or may be a small fraction of an inch higher to make sure that the actual base line for determining the plane X—X will not be affected by irregularities of the work itself.

The upper clamps are then started on the downward movement so that they engage the upper face of the work immediately after the lower clamps have come to rest by links 84 engaging pins 84a. As the lower clamps are supported by solid metal down to the fixed rollers 75, the upper clamps are arrested by a fixed resistance.

When the plunger 76 pushes the lower clamping devices upward, the stoppage of the clamp movement is not accomplished solely by the links 84, because, when the upward movement is arrested by the pins 84a, the links 82 swing outward on their pivots until the upper ends of links 82 and 84 come in contact with vertical stopping walls. In Fig.

16, these walls are the inner faces of the lower legs of the H. In Fig. 1, they are the inner corners of the angles 11, through which the force is conveyed to the shoes 61 and 63 shown in Figs. 5, 7 and 8. In other words, the lower clamping devices furnish a lifting force and a laterally expanding force against or through the work operated upon.

When the plunger 89 pushes the upper clamping devices downward, the downward movement of the clamping devices is arrested by contact with the upper face of the work, but the downward movement of the plunger 89 continues by the spreading of the links 99 until such spreading is stopped by rollers 101 and 102 coming in contact with the vertical walls of the work.

From this description it will be seen that the upper and lower clamping devices, acting together, have a vertical compressing action upon the work clamped. Also, that the same clamping devices have a simultaneous expanding action in a lateral or transverse direction. And further, they act automatically to center the work upon the plane Y—Y, and simultaneously they furnish a base for determining the location of the plane X—X.

Because these clamping devices have a compressive action in one direction and an expanding action in another direction, we call them compresso-expanding devices, and by that term we not only mean that they compress in one direction and expand in another, but that they also act to center the work in the machine. The use of this term also serves to distinguish these particular clamping devices by which the work is held between shoes 61 and 63.

By referring to Figs. 1, 5 and 8, it will be seen that the work to be operated upon may vary considerably in horizontal width, as well as vary considerably in the thickness of metal between the upper and lower clamping devices. It may also vary considerably in the thickness of the metal to be drilled by the horizontal drills. We will consider these things one at a time.

The vertical plane Y—Y running longitudinally through the machine is a fixed thing, and the upper and lower clamping devices shown in Figs. 5 and 8 are centered in this plane. The spacing pieces 59 and the screws 53 for moving the slides 51 and 52 serve as means for locating the clamping faces of shoes 61 and 63 at substantially equal distances from this plane.

At the left in Fig. 8, the shoe 61 is held with its face parallel with the central vertical plane, and at a distance which is determined by the spacers 59 behind it. At the right, the spacers 59 normally locate the face of the shoes 63 a little further from the central plane Y—Y than are the shoes 61, and the wedges 66 serve to force the shoes 63 toward the central plane.

When the column is made of built up sections, as shown in Fig. 1, the shoe 63 is first moved to get the proper column width between shoes 61 and 63. The lower clamping devices are then raised to give the proper elevation to the parts forming the column. And finally the upper clamping devices come down to clamp the parts vertically against the lower clamping devices and laterally against the shoes 61 and 63.

When the column is a solid body with cover plates, as shown in Fig. 8, the bottom clamps move first, the shoe 63 is moved second to grip the parts laterally, and upper clamping devices come down last.

When H-columns are part of the work, as in Figs. 5 and 8, the resistance from shoes 61 to shoes 63 is conveyed through the web 40 of such column. When the work consists of angles and plates, as shown in Fig. 1, the resistance is conveyed from one side to the other through the clamping devices.

Columns to be drilled may vary from fifteen to fifty feet in length, and may require rivet holes through substantially the entire length. Horizontally, the drill sockets are ordinarily at three-inch centers. When the drills are arranged as shown in Fig. 3, the drilling at one time covers a space of two feet.

To drill a long column, the elements are assembled and then brought up to the drills. They are then clamped vertically and horizontally as described, and the slides 15 are advanced to force the drills upon the work. When the drills have finished the holes through the elements clamped together, the slides are retracted to withdraw the drills from the work.

During the withdrawal of the drills, the vertical and horizontal clamps are released, and, as soon as the drills are clear of the work, the spacing table advances it two feet, more or less according to the spacing of rivets called for by the detailed drawing. As soon as the spacing table has completed the column movement called for, the clamps engage the work as before, and the drills are advanced as before.

A contemplation of these conditions will make it evident that the movement of a column through the machine may involve twenty or more steps, and that the drills must be advanced and retracted an equal number of times. By reference to Fig. 18, which shows holes drilled in a particular column, it will be seen that not all drills operate each time that the drill head advances upon the work, and that there are variations in the distribution of holes in different parts of the column. These facts mean that when the slides 15 are retracted to withdraw drills from the holes drilled, that retraction must be far enough to permit some drills to be removed from their sockets and some inserted in other sockets.

In Fig. 1, the drills are required to pass through two thicknesses of comparatively thin metal. In Figs. 5 and 8 they are required to pass through three thicknesses of thicker metal, and in still other cases they may be required to pass through two or three times the thickness shown in Fig. 8.

Figure 4:
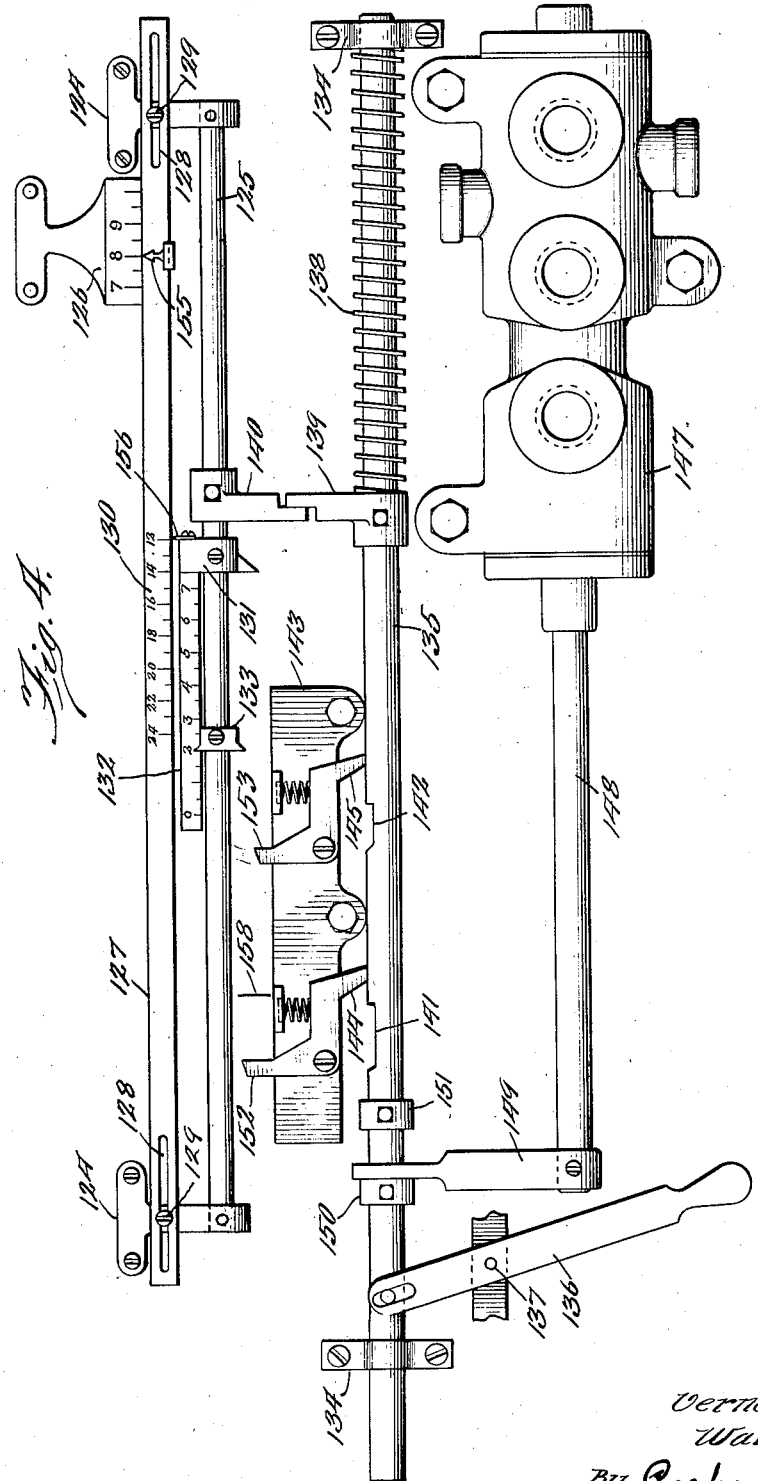
Fig. 4 is an enlarged elevation of the devices of Fig. 1 which are used in controlling the movements of a horizontal drill-carrying head.

From these various facts it will be seen that several things affect the location of the slides 15 on the bed plate, and their movements toward and from the work. One of these is the width of the column between the shoes 61 and 63. Another is the length of the drills held in the drill sockets, and a third is the thickness of the metal drilled. It is desirable to control these movements so that the idle time between drilling operations will be reduced, and the devices shown in Figs. 1 and 4 are designed for that purpose.

Secured on each slide 15 are holders 124 which carry a bar 125. Also on each slide is a short scale 126. A bar 127 with slots 128 therein is made adjustable on the holders 124 by means of screws 129, and on this bar is a scale 130.

Adjustable on the bar 125 is a collar 131 which carries a scale 132 parallel with and closely adjacent to the bar. Also, on the bar 125 is another collar 133 having a pointer which may be brought to any graduation on scale 132 by adjusting said collar 133 on the bar 125.

On the bed plate 14 are bearings 134 which carry sliding rods 135 movable longitudinally in their bearings by means of levers 136 pivoted to the bed plate at 137. Confining the description to the right side only of the machine, the rod 135 is normally forced to the left by a spring 138 between the right hand bearing 134 and an adjustable arm 139 on rod 135. On the bar 125 is an adjustable arm 140 which engages the arm 139 upon occasions to be described.

In the rod 135 are cut notches 141 and 142, and secured on the bed plate is a bracket 143 to which are pivoted pawls 144 and 145. Springs over these pawls act to hold them normally in contact with the rod 135. These parts are so related to each other that when the lever 136 moves rod 135 to the right to compress spring 138, first the pawl 144 drops into notch 141, and later pawl 145 drops into notch 142.

On the slide 15 is a connection 146 (Fig. 1) to a fluid pressure motor for reciprocating the slide toward and from the work, and located at a convenient place is a valve 147 for controlling the slide movements. As these are standard things, the motor is not shown and the valve is shown only in outline. The valve 147 is operated by a valve stem 148 having thereon an arm 149 which extends up between adjustable set collars 150 and 151 on the rod 135.

The pawl 144 has a long vertical arm 152, and the pawl 145 has a short vertical arm 153. The set collar 133 has a short downward projection which is arranged to pass over the arm 153 and then strike arm 152 to release pawl 144. The scale-carrying collar 131 has a longer downward projection which is adapted to engage the arm 153 to release pawl 145.

The scale 126 is graduated at full size in inches, and is used to represent the length of the drills used in drilling the work. On the bar 127 is a pointer 155 which may be set opposite any graduation on scale 126 by loosening the screws 129 and shifting the bar 127. The set shown in the drawings indicates that drills eight inches long are being used for drilling purposes.

The scale 130 on bar 127 is graduated at one-half size in inches, and numbers opposite the graduations indicate the width of the column between shoes 61 and 63. On the set collar 131 is a small pointer 156 which may be made to come opposite any graduation on the scale 130 by shifting the collar 131 on bar 125.

As shown in the drawings, the pointer 156 is set at the figure "12" on scale 130. This means that the set is for a twelve inch column, and the half-size graduations on scale 130 mean that the set is for an operation six inches from the central plane Y—Y to the shoe which engages the side of the column.

The scale 132 on bar 125 is for the thickness of the metal drilled. As set in the drawings, it represents that the drills are to go through two inches of metal.

Figs. 1 and 4 represent the position of parts when the slides 15 are standing idle, as is the case when they are retracted and drills are being changed.

In this position of the slides, the distance from the ends of the drills 44 and 45 to the plate 13 of the work to be drilled, is equal to the distance between collar 131 and the vertical arm of pawl 145. For the purpose of condensation of drawings without unduly reducing the scale, the distance between drills and work has been shortened in Fig. 1 to what it would be when the collar 131 is close to the arm of pawl 145. There may be one handle 136 for each slide, or a single handle may control all three slides. The description of this operation will be confined to one handle for the scales on one side only of the machine.

The handle 136 is moved on its pivot to shift the rod 135 to the right against the resistance of spring 138. In this movement, the pawl 144 first drops into notch 141 and later the pawl 145 drops into notch 142 to hold the rod in moved position. Also, the arm 139 is moved away from the stop arm 140. In the operation of shifting the rod 135, the collar 150 operates through arm 149 and valve stem 148 to shift the valve 147.

As before stated, the valve 147 controls the rate of carriage movement. The shift just described is one which sets the valve 147 for high speed movement of carriage 15 toward the left, which is toward the work to be drilled. In this movement, all parts above the bracket 143 move with the carriage because secured thereto, whereas the bracket 143 and parts below are stationary because secured to the bed plate.

As the carriage moves, the collar 133 passes over the arm 153 without touching, but collar 131 strikes that arm to release pawl 145. When released, the spring 138 pushes rod 135 to the left until stopped by pawl 144 engaging the shoulder in notch 141. In this movement, the collar 151 operates through arm 149 and valve stem 148 to shift valve 147, the effect of which is to reduce the carriage movement from high speed to drilling speed.

At the time the collar 131 releases pawl 145, collar 133 is at a point indicated by a line 158, which is placed on the drawings for descriptive purposes. The distance from line 158 to the arm 152 is the distance through which the carriage must move at drilling speed before the collar strikes the arm 152 to completely release the rod 135. As the collar 133 is set at numeral "2" on scale 132, the distance from line 158 to arm 152 is two inches. If collar 133 had been set at the "0" mark, then it would strike arm 152 at the same time that collar 131 struck arm 153, and there would have been no movement at drilling speed. If the collar 133 had been set at some other graduation on scale 132, then the distance the carriage would move at drilling speed would be correspondingly changed.

When the rod 135 is completely released as described, it shifts the valve 147 to reverse the slide movement and cause it to move at high speed toward the right. When the carriage moved to the left, the arm 140 moved away from arm 139. When the carriage moves to the right, the arm 140 strikes arm 139 to shift the valve 147 to stop the carriage at the position from which it started.

On the upper head 16 (Fig. 1) are drill carrying blocks 160 and 161 which are movable laterally toward and from the central plane Y—Y in the same way that the blocks 35 and 36 are movable from and toward the plane X—X. On the edge of the upper bracket 17 is a scale 162 graduated in each direction from a zero point lying in the plane Y—Y.

On the edges of the slides which carry blocks 160 and 161 are arrow marks to indicate how far the inner drills are from the plane Y—Y. These things correspond to what has been described for blocks 35 and 36 with their scales and indicating arrows, and do not need further description.

What we claim is:

1. In a machine of the class described, a preliminary supporting means for supporting work with its lower face at a fixed elevation, an upwardly moving clamping member arranged to engage the lower face of the work and thrust upwardly and laterally on said work, a stop for limiting said upward thrust, a downwardly moving clamping member arranged to engage the upper face of the work and thrust downwardly and laterally on said work, a fixed abutment at one side of the work and arranged to resist the lateral thrust of the lower and upper clamping members, and a laterally movable clamping member arranged to engage the side of the work opposite said abutment and clamp said work thereto.

2. A machine frame provided with an opening through which work may be moved, a preliminary supporting means for supporting the work with its lower face at substantially the elevation it is to be while in the machine, connections for moving the work step by step through said opening, abutments at one side of the work at spaced apart points in the machine, and lower, upper and laterally movable clamping members located at the spaced apart points and arranged to automatically bring the work to and hold it a predetermined exact position within the machine.

3. A machine providing a channel having a fixed side and a movable side, means for moving work step by step through said channel, an upwardly movable clamping device arranged to form a temporary fixed lower side to said channel, a downwardly movable clamping device, and power devices for moving the last mentioned clamping device and the movable side so as to clamp the work against the fixed sides.

4. A channel having one side composed of pivoted shoes located at spaced apart points, upwardly moving clamping devices arranged to engage the lower face of the work and form a temporary bottom to said channel, pivoted shoes forming the other side of the channel and movable to clamp work against the first shoes, and downwardly movable clamping devices operable to clamp the work against the upwardly movable clamping devices.

5. A machine providing standards at spaced apart points and each standard having an opening therethrough, adjustable slides supported in said openings on opposite sides of a central vertical plane through said machine, shoes pivoted upon the slides upon one side of the central plane and forming one side of a work-receiving channel, supplementary slides carried by the adjustable slides on the other side of the machine, shoes pivoted upon the supplementary slides, and means for moving the supplementary slide to clamp work against the first mentioned shoes.

6. A machine providing standards each having an opening therethrough, adjustable slides supported in said openings on opposite sides of a central vertical plane through the machine, shoes pivoted upon the slides upon one side of the central plane, adjustable means for holding the shoes with their faces at predetermined positions, supplementary slides carried by the adjustable slides on the other side of the central plane, a shoe pivoted upon each supplementary slide and each shoe having a limiting self adjustment on its pivot, power devices for moving the supplementary slides to clamp work between opposite shoes, and retracting means for releasing the clamping action when the power devices are withdrawn.

7. A machine frame provided with an opening for the passage of work therethrough, adjustable slides supported within said opening on opposite sides of a central plane passing through the machine, a supplementary slide carried by one of said adjustable slides, means for bringing work to a predetermined elevation between said slides, and means for moving the supplementary slide on its support to clamp such work.

8. A machine frame provided with an opening for the passage of work therethrough, slides carried in said frame and located on opposite sides of a central vertical plane through said machine, means for adjusting said slides toward and from said plane to furnish the side walls of a channel for the work, a supplementary slide carried by one of the adjustable slides, and a power device for moving the supplementary slide so as to clamp the sides of the work in said channel.

VERNON B. TREVELLYAN.
WALLACE W. SMITH.